United States Patent
Blackburn

(10) Patent No.: US 11,718,357 B2
(45) Date of Patent: Aug. 8, 2023

(54) METHOD FOR WELDING CARBIDE

(71) Applicant: Bradley Blackburn, Kamloops (CA)

(72) Inventor: Bradley Blackburn, Kamloops (CA)

(73) Assignee: CLAW MANUFACTURING LTD., Kamloops (CA)

( * ) Notice: Subject to any disclaimer, the term of this patent is extended or adjusted under 35 U.S.C. 154(b) by 859 days.

(21) Appl. No.: 16/565,300

(22) Filed: Sep. 9, 2019

(65) Prior Publication Data

US 2020/0001938 A1 Jan. 2, 2020

Related U.S. Application Data

(63) Continuation of application No. 15/594,084, filed on May 12, 2017, now Pat. No. 10,427,736.

(51) Int. Cl.
| | | |
|---|---|---|
| *B62D 55/28* | (2006.01) | |
| *B23K 9/20* | (2006.01) | |
| *B23K 9/00* | (2006.01) | |
| *F16B 35/06* | (2006.01) | |
| *B23K 103/00* | (2006.01) | |
| *B23K 101/00* | (2006.01) | |

(52) U.S. Cl.
CPC ............ *B62D 55/28* (2013.01); *B23K 9/0026* (2013.01); *B23K 9/20* (2013.01); *B62D 55/286* (2013.01); *B23K 2101/006* (2018.08); *B23K 2103/50* (2018.08); *F16B 35/06* (2013.01)

(58) Field of Classification Search
None
See application file for complete search history.

(56) References Cited

U.S. PATENT DOCUMENTS

| | | | |
|---|---|---|---|
| 3,558,198 A | 1/1971 | Tomita | |
| 3,802,751 A | 4/1974 | Beyers | |
| 3,838,894 A | 10/1974 | Reedy | |
| 4,750,792 A | 6/1988 | Caron et al. | |
| 6,540,310 B1 | 4/2003 | Cartwright | |
| 2005/0269878 A1* | 12/2005 | Lefgren | A43C 15/16 305/180 |
| 2015/0217817 A1 | 8/2015 | Delisle et al. | |

FOREIGN PATENT DOCUMENTS

| | | |
|---|---|---|
| RU | 2006409 | 1/1994 |
| SU | 1452741 | 1/1989 |
| WO | 2016123687 | 8/2016 |

OTHER PUBLICATIONS

International Searching Authority, The International Search Report of the International Searching Authority for International Application No. PCT/CA2015/050773, Filed Aug. 13, 2015, 4 pages, Receiving Office—Canadian Intellectual Property Office.

* cited by examiner

*Primary Examiner* — Daniel J. Schleis
(74) *Attorney, Agent, or Firm* — Richard D. Okimaw

(57) ABSTRACT

A method for securing a wear resistant body to a steel base comprise locating a body of tungsten carbide on a surface of the steel base, surrounding the body of tungsten carbide with a weld pool and while the weld pool is hot, slowly cooling the weld pool so as to assist with adhesion of the weld pool to the body of tungsten carbide by the application of head from frictional contact with a rotary wire brush.

7 Claims, 14 Drawing Sheets

METHOD FOR WELDING CARBIDE

CROSS REFERENCE TO RELATED APPLICATION

This application is a continuation application of U.S. patent application Ser. No. 15/594,084 filed May 12, 2017 entitled Wear Resistant Studs for Vehicles.

BACKGROUND OF THE INVENTION

1. Field of Invention

The present invention relates generally to studs for tracked vehicles and in particular to wear resistant studs for use in tracked vehicles and methods for forming wear resistant studs.

2. Description of Related Art

Tracked vehicles are useful in many areas where softer ground would impede the movement of wheeled vehicles. Disadvantageously, due to the lower ground pressure such tracks may suffer from reduced traction on the ground and particularly on frozen ground or ice.

Previous attempts to provide studs in tracked vehicles have not need satisfactory. In particular, many such studs have bred embedded or passed through the track and commonly formed of steel. Such steel studs however are known to wear quickly when used on pavement or asphalt are well.

Tungsten carbide is a material which is known to have excellent wear properties but is brittle and therefore not suitable for forming the entire stud.

Additionally tungsten carbide is not commonly able to be welded and is therefore commonly brazed to an underlying metal. However, brazing is known to be weaker than welding.

SUMMARY OF THE INVENTION

According to a first embodiment of the present invention there is disclosed a method for securing a wear resistant body to a steel base comprising locating a body of tungsten carbide on a surface of the steel base, surrounding the body of tungsten carbide with a weld pool and while the weld pool is hot, slowly cooling the weld pool so as to assist with adhesion of the weld pool to the body of tungsten carbide by the application of head from frictional contact with a rotary wire brush.

The weld pool may completely cover the body of tungsten carbide and the top surface. The method may further comprise forming a cavity in the surface of the steel base wherein the body of tungsten carbide is located within the cavity prior to being surrounded by the weld pool. The top member may comprise a bar extending perpendicularly between the at least to elongate threaded stud members. The body of tungsten may comprise a length of tungsten carbide having a length less than the surface of the steel base.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
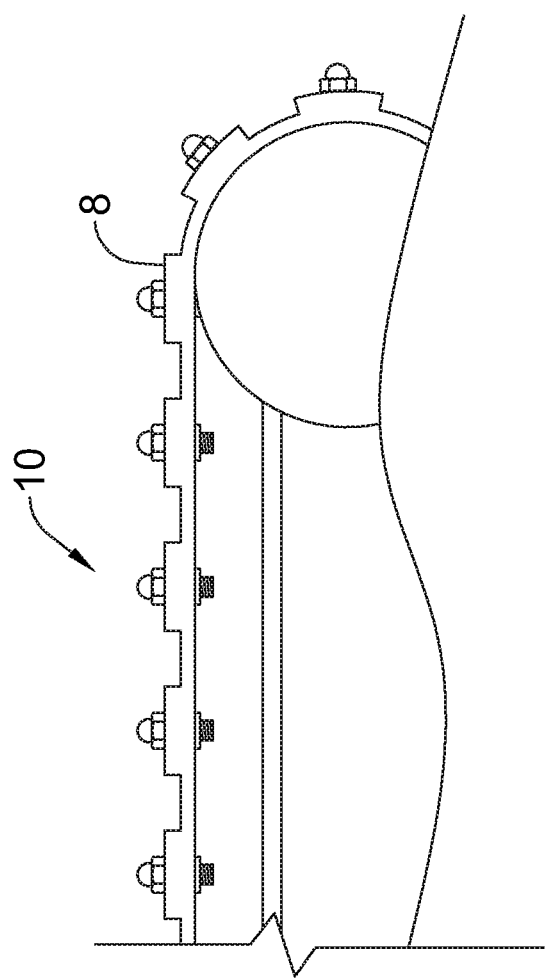
FIG. 1 is a side view of a track for use on tracked vehicle having a plurality of studs formed according to a first embodiment of the present invention.

Referring to FIG. 1, continuous track 8 for use on a tracked vehicle is shown generally at 8 with at least one wear resistant stud 10 passed therethrough. The stud 10 as illustrated further in FIG. 2 comprises at least one elongate threaded member 12 with top member 14 and bottom collar 20 adapted to retain the track 8 therebetween when the threaded member 12 is passed therethrough. The top member 14 includes a wear resistant body 30 as will be further described below.

Figure 2:
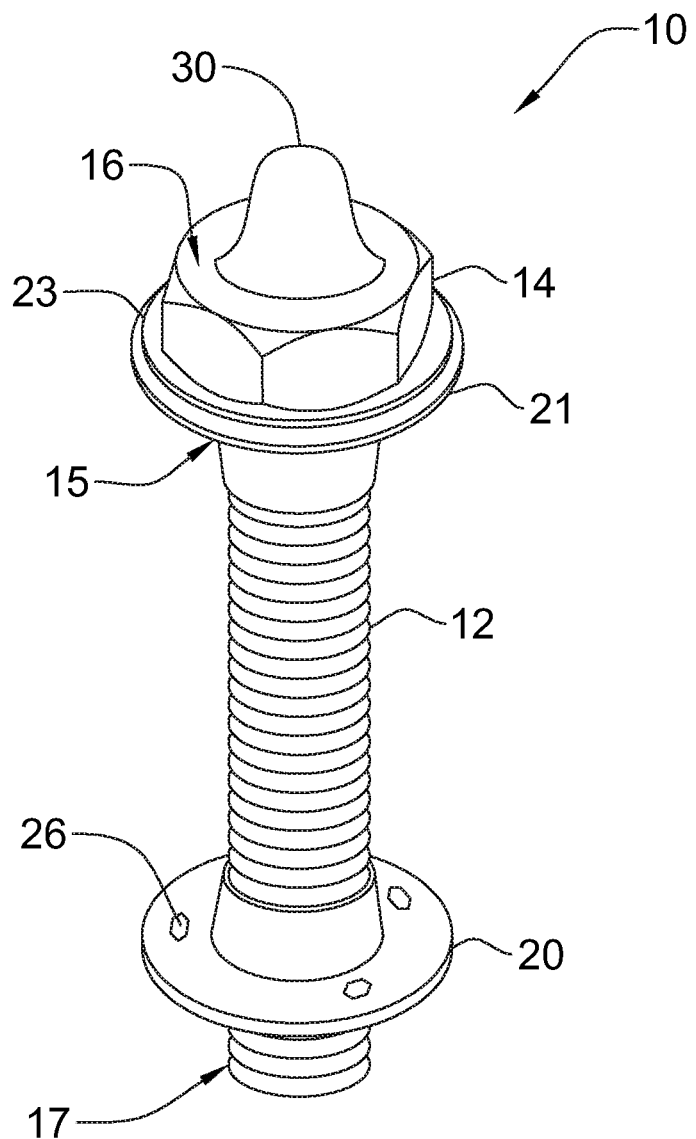
FIG. 2 is a perspective view of one of the studs of FIG. 1 being passed through the track of the vehicle.
Figure 3:
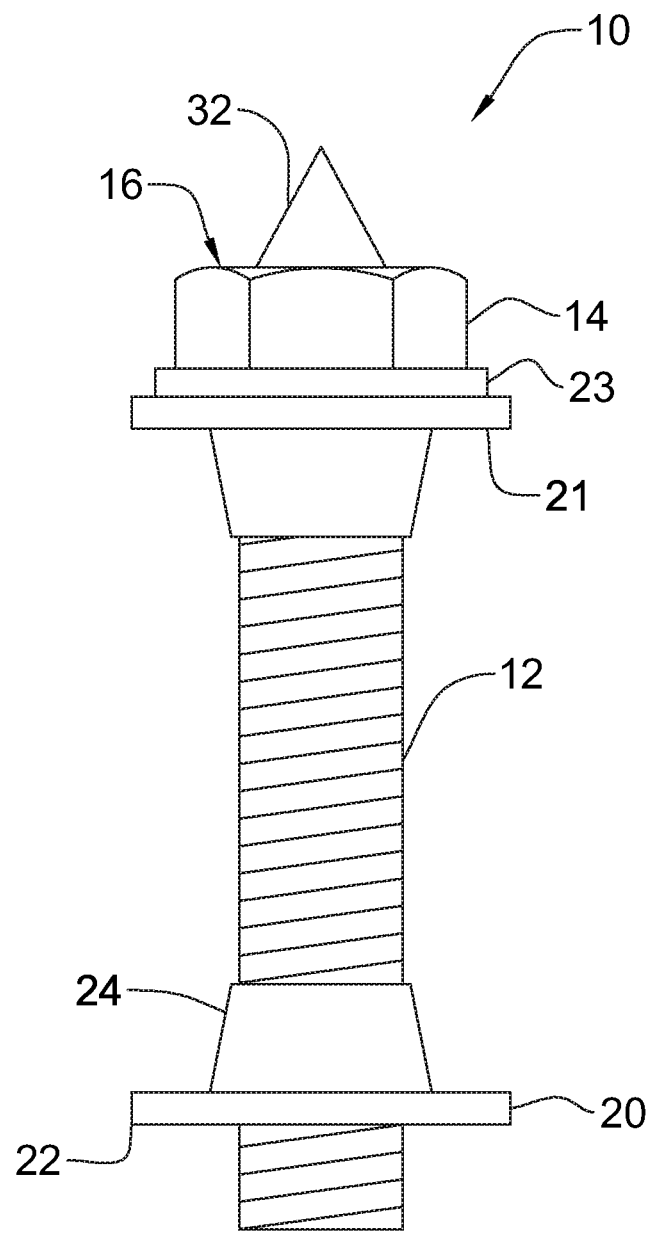
FIG. 3 is a side view of the stud of FIG. 1 being formed at a first step with a tungsten carbide element located on a top surface thereof.

The threaded member 12 may comprise any elongate member extending between top and bottom ends, 15 and 17, respectively wherein the top member 14 is located at the top end 15. The threaded member may comprise any suitable threaded member, however in practice it has been found that grade 8 type fasteners have been particularly useful. The threaded member 12 may also be selected to have a diameter to provide a suitable strength to the stud 10 according to known methods. In particular, it has been found that diameters between ⅜ and 1¼ inch (10 and 32 mm) has been useful although it will be appreciated that other sizes may be useful as well. The top member 14 may comprise a bolt head of the threaded member as illustrated in FIG. 2 or other structures adapted to provide a top surface as will be further described below. The bottom collar 20 is threadably received on the threaded member 12. As illustrated in FIG. 3 the bottom collar 20 may be formed with a planar member 22 and a cylindrical portion 24 extending therefrom although it will be appreciated that other collar types may be utilized as well. Optionally, the threaded member 12 may also include a top collar 21 formed similar to and positioned on the threaded member in mirror to the bottom collar as well as a washer 23 as is commonly known. The planar member 22 may optionally include a plurality of key bores 26 extending therethrough at a position adapted to receive a key or wrench for tightening the bottom collar 20 on the threaded member 12. It will be appreciated that any wrench type may be utilized as well such as by way of non-limiting example, hex nuts or the like. The top member 14 may be a separate body secured on the threaded member 12 or may optionally be co-formed with the threaded member 12. The top member 14 defines a top surface 16 adapted to have the wear resistant body 30 formed thereon as will be further described below.

Figure 4:
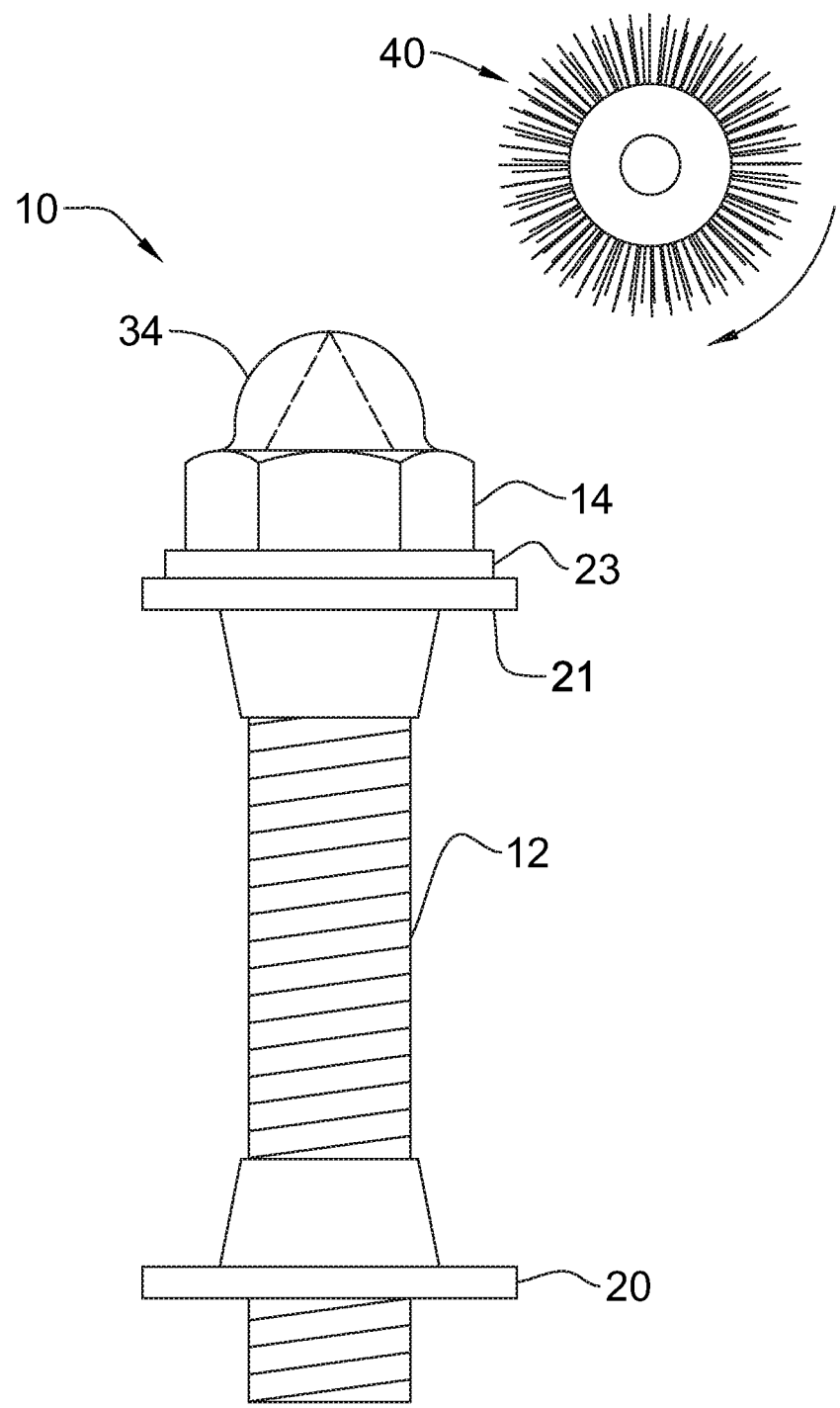
FIG. 4 is a side view of the stud of FIG. 1 being formed at a second step with a weld pool being formed around the tungsten carbide element.

Referring to FIG. 3, the wear resistant body 30 of the stud 10 is formed by first locating a body of tungsten carbide 32 on the top surface 16 of the top member 14. As illustrated in FIG. 3, the body of tungsten carbide 32 has a triangular cross section, although it will be appreciated that any other cross section, such as, by way of non-limiting example, square, rectangular or round may also be utilized. As illustrated in FIG. 4, after the body of tungsten carbide 32 has be located at the desired location a weld pool 34 may be formed therearound so as to secure the body of tungsten carbide 32 to the top surface 16. In particular, the weld pool 34 is formed to surround and cover the tungsten carbide body 32 as well as matingly engage the top surface 16. Thereafter, a rotary wire brush 40 is applied to the weld pool 34 to apply heat thereto and reduce the rate of cooling of the weld pool 34. It will be appreciated that the slowed cooling of the weld pool 34 will assist with adhesion between the weld pool and the tungsten carbide body as well as reducing brittleness of the weld pool. After sufficient cooling, the wire brush 40 is removed leaving the finished wear resistant body 30. It will be appreciated that the amount of time necessary will be dependent upon the size of the weld. By way of non-limiting example, it has been found that slowly cooling through the use of the wire brush to a temperature of approximately 1000 degrees Fahrenheit (500 degrees Celsius) has been useful. In practice, it has been found that a MIG welding process utilizing 0.045" ER70S-6 welding wire and an argon/carbon dioxide shielding gas blend with a carbon dioxide content of approximately 25% has been found to be effective.

Figure 5:
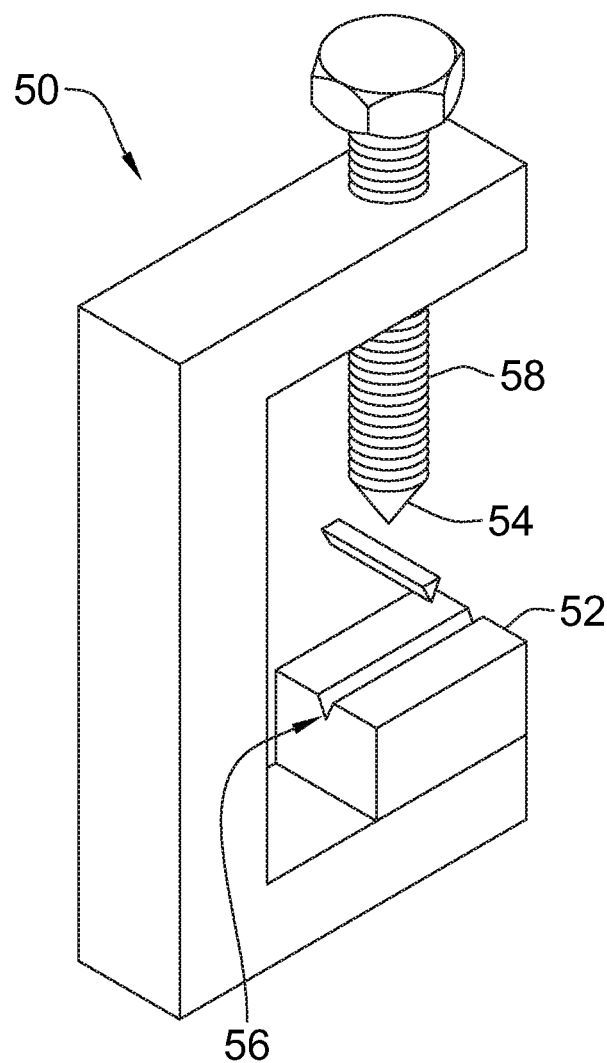
FIG. 5 is a perspective view of an apparatus for forming elongate portions of tungsten carbide into elements for use on the stud of FIG. 1.

Turning now to FIG. 5, an apparatus 50 for breaking lengths of tungsten carbide into shorter lengths for use in the present wear resistant studs is illustrated. The apparatus 50 comprises a bottom support plate 52 and a top threaded press 58 adapted to apply a downward force to a length of tungsten carbide stock 31 located on the support plate 52. The support plate 52 includes a gap 56 extending transverse to the tungsten carbide stock 31 at a position aligned with the threaded press 58. In operation, the tungsten carbide stock 31 may be located at a position corresponding to the length of tungsten carbide stock 31 wished to be separated from the larger piece. Thereafter, the threaded press 58 may be turned downward to engage upon the tungsten carbide stock 31 and break it at the location of the gap 56. It will be appreciated that other methods of forming the tungsten carbide to the desired length may also be utilized. As illustrated in FIG. 5, the press 85 may include a sharpened end point adapted to apply a point load to the tungsten carbide stock 31 above the gap 56.

Figure 6A:
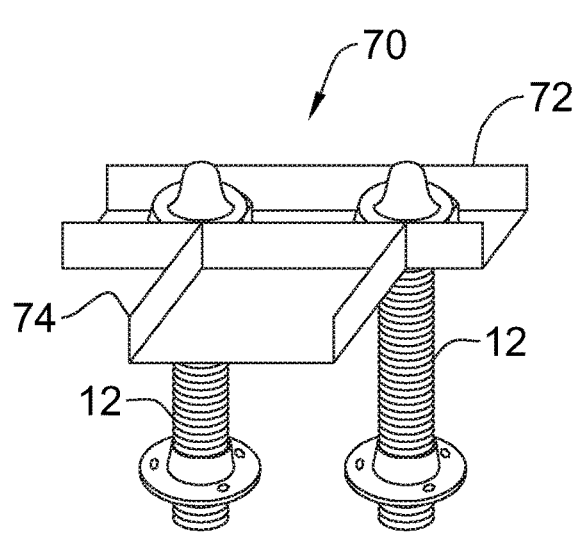
FIG. 6a-6d are perspective views of studs for use in a tracked vehicle according to further embodiments of the present invention.
Figure 6B:
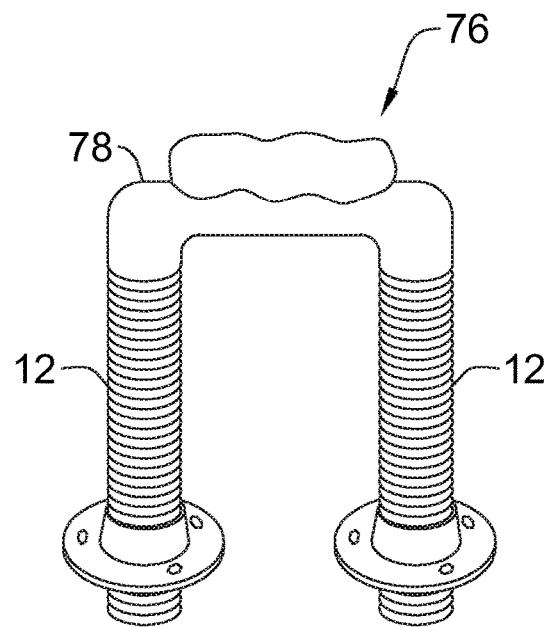
Figure 6C:
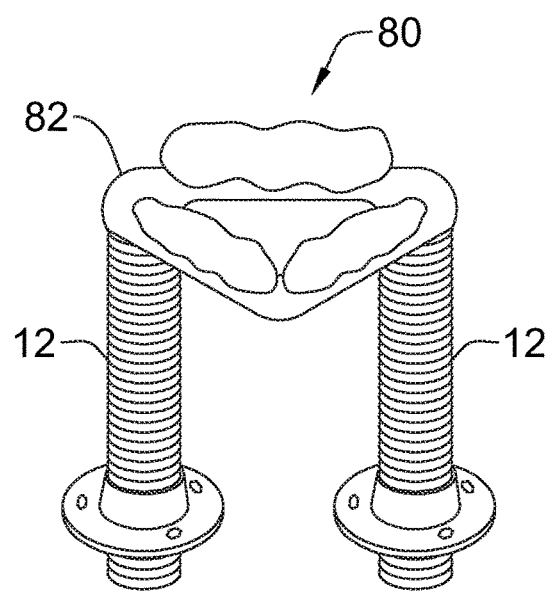
Figure 6D:
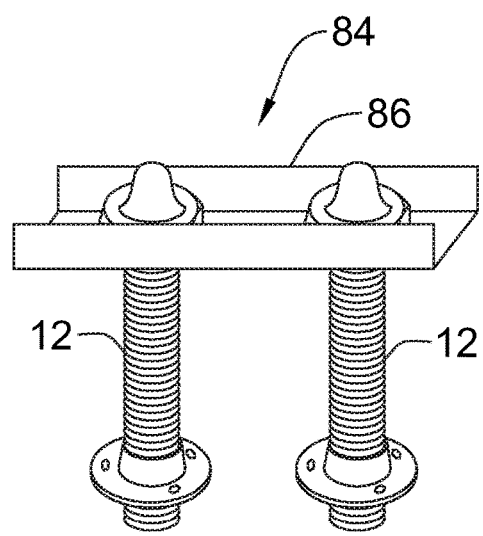
Figure 15:
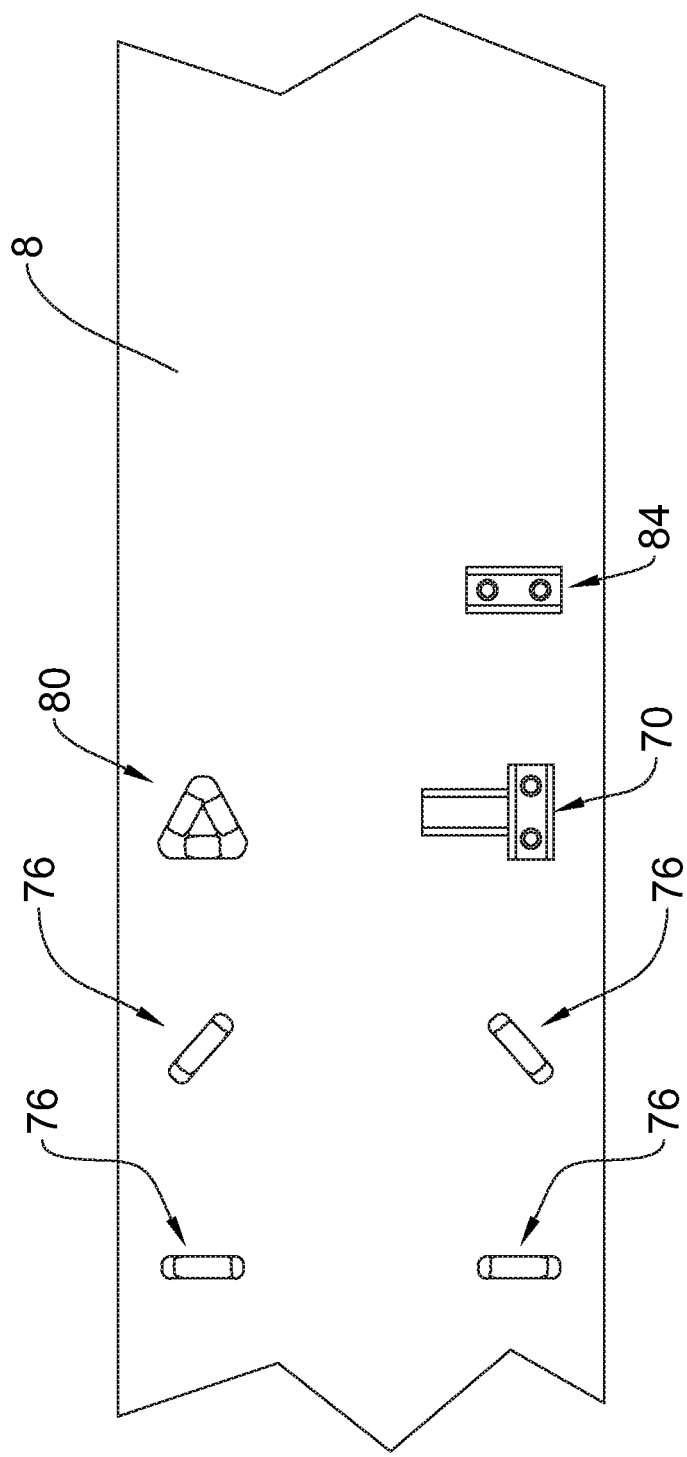
FIG. 15 is a top plan view sectional view of section of track having a plurality of studs inserted therethrough.

Turning now to FIGS. 6a through 6d, alternative embodiments of wear resistant studs are illustrated. In particular, as illustrated in FIG. 6a, the wear resistant studs 10 may be passed through a t-bar 70 formed of first and second channel sections, 72 and 74, respectively. As illustrated in FIG. 15, the first channel section 72 may be aligned with a lengthwise direction of the track 8 wherein the second channel section 74 may be transverse to the track 8. Furthermore, a bar claw 76 may be formed with the top member 14 being formed by a perpendicular bar 78 extending between a pair of threaded members 12 as illustrated in FIG. 6b wherein the bar claw 76 may be positioned transverse or angularly relative to the track 8 as illustrated in FIG. 15. As illustrated in FIG. 6c, a v-shaped claw 80 may be also be formed with the top member formed in a triangular shape 82. It will be appreciated that although a triangular shape is illustrated for the v-shaped claw, any other shape such as, by way of non-limiting example, circular, rectangular or irregular may also be utilized. Although the v-shaped claw 80 is illustrated in FIG. 15 as having the threaded members 12 longitudinally along the track, it will be appreciated that other orientations such as transverse or diagonal on the track may also be utilized.

Figure 7A:
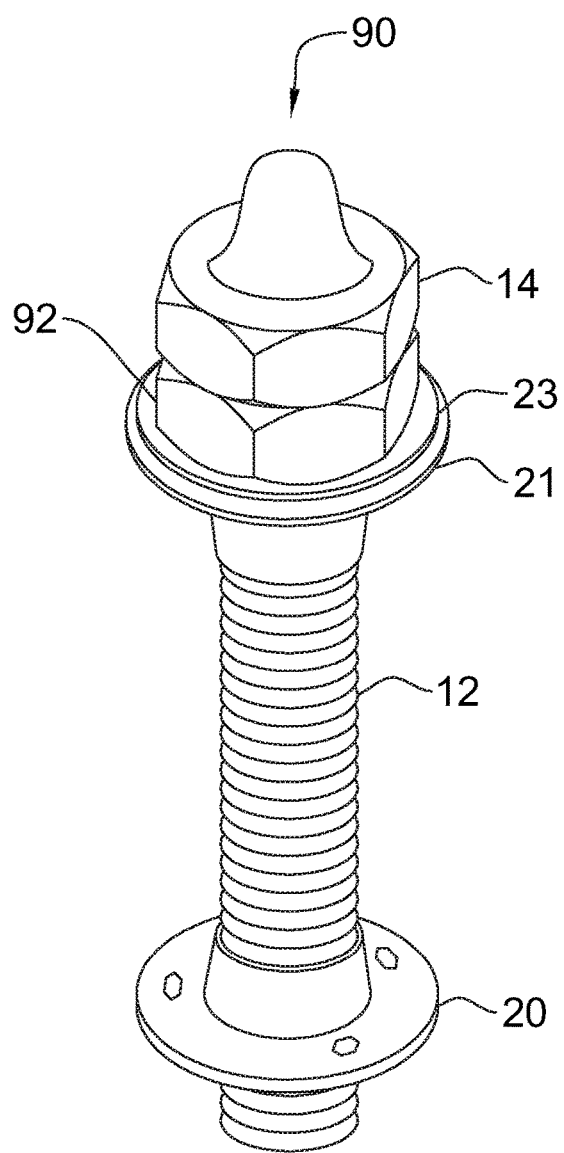
FIGS. 7a-7b are perspective views of the studs for use in a tracked vehicle according to further embodiments of the present invention.
Figure 7B:
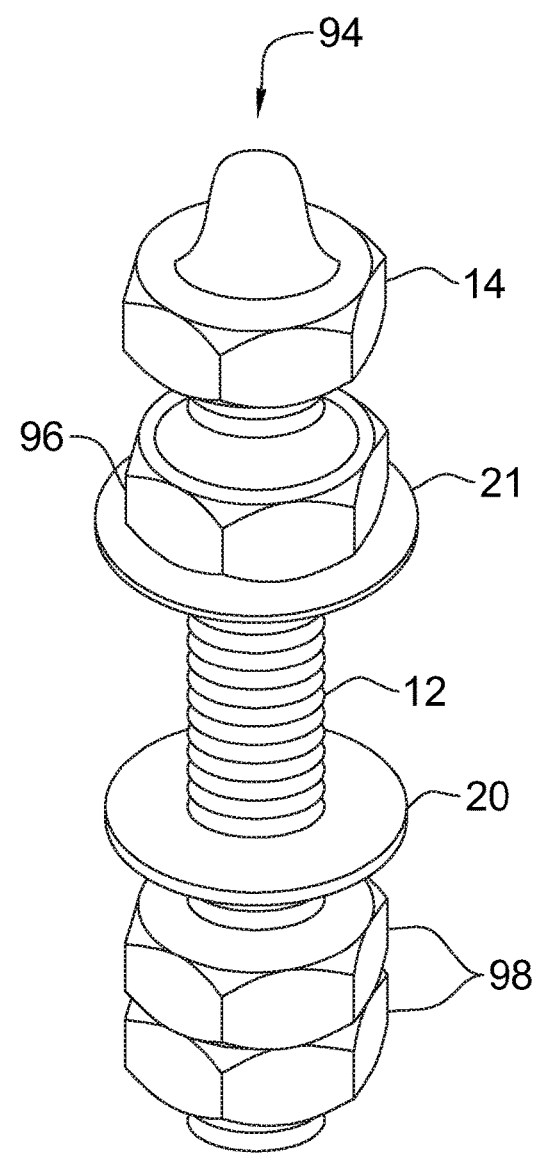

Turning now to FIGS. 7a through 7b, alternative embodiments of wear resistant studs are illustrated. In particular, as illustrated in FIG. 7a, the wear resistant studs 90 include an additional nut 92 below the top member 14 so as to space the wear resistant body 30 further from the track 8. Additionally, for use on metal tracks, the wear resistant stud 94 as shown in FIG. 6b may include a self locking or nylock nut 96 below the top member 14 wherein a double nut 98 is provided to clamp the wear resistant stud 94 to the back side of the track. In operation, a user may loosen the double nuts 98 and position the self locking nut 96 to provide a desired height to the wear resistant body 30. Thereafter the double nuts 98 may then be retightened to secure the stud to the track.

Figure 8:
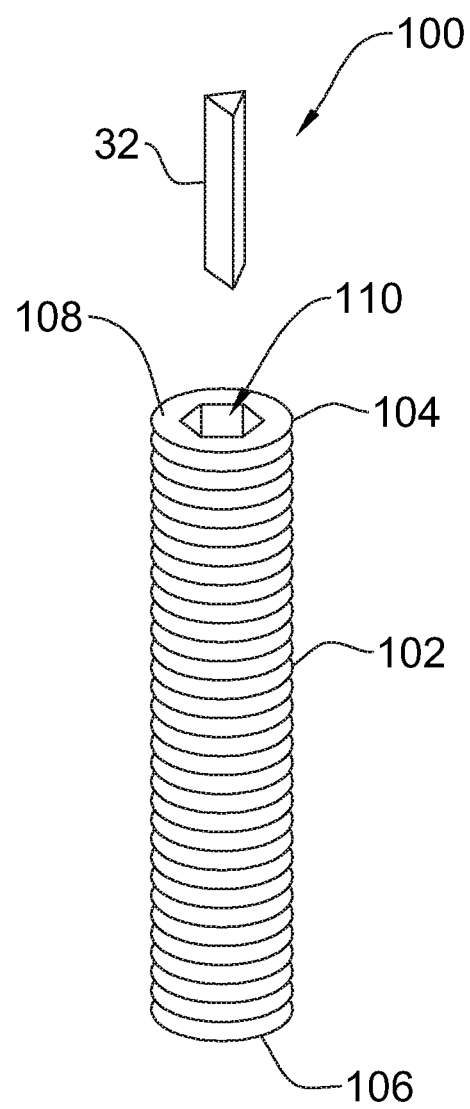
FIG. 8 is a perspective view of a stud according to a further embodiment of the present invention at a first stage of being formed.
Figure 9:
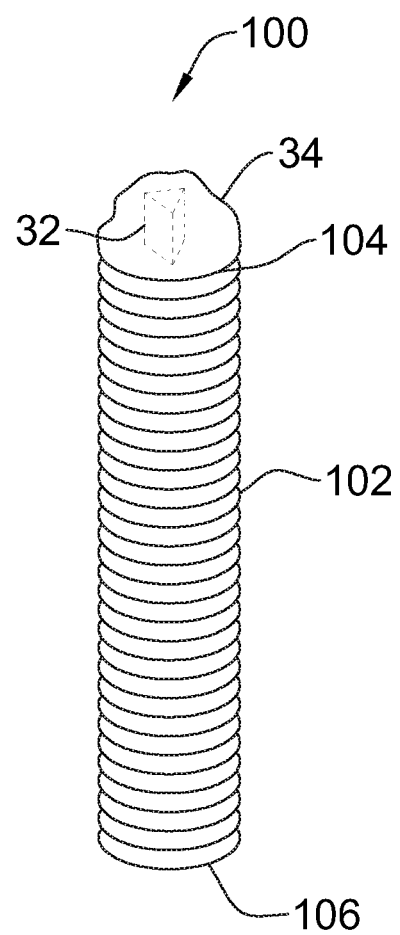
FIG. 9 is a perspective view of the stud of FIG. 8 at a third stage of being formed.
Figure 10:
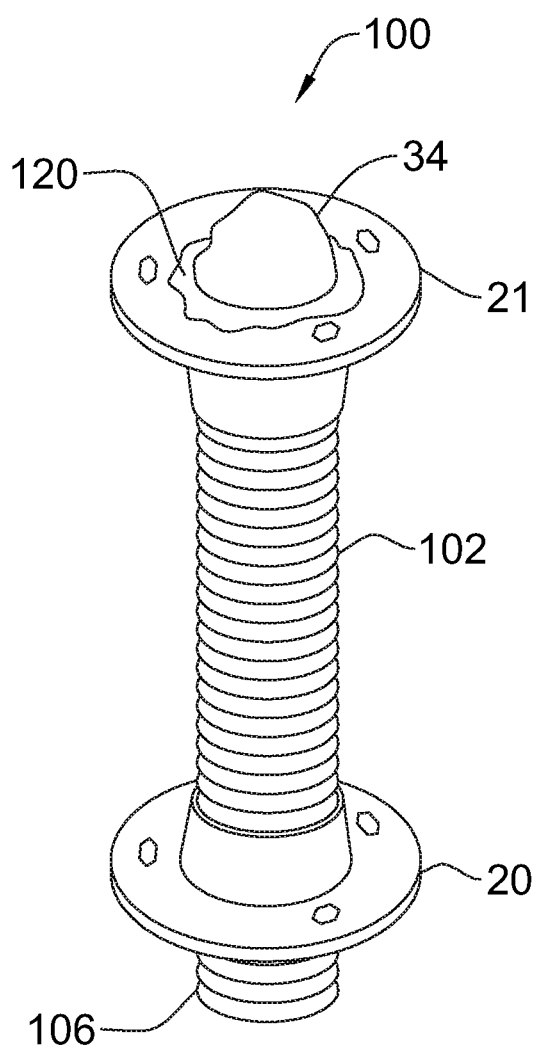
FIG. 10 is a perspective view of the stud of FIG. 8 at a third stage of being formed.

Turning now to FIGS. 8 through 10, an adjustable wear resistant stud 100 is illustrated. The adjustable wear resistant stud 100 comprises an elongate threaded member 102 member extending between top and bottom ends, 104 and 106, respectively. The top end 104 defines the top surface 108 and is formed without a head portion and includes a bore 110 into the top surface 108. As illustrated, the bore 110 may be a hex socket or the like as are commonly known. The body of tungsten carbide 32 is sized to fit within the bore 110 in a lengthwise configuration as illustrated in FIG. 8. Thereafter, as illustrated in FIG. 9, the weld pool 34 is formed around the body of tungsten carbide 32 and the top surface 108 so as to cover the body of tungsten carbide 32 as set out above. As illustrated in FIG. 10, top and bottom collars 21 and 20 may then be threadably located on the threaded member 102 as set out above such that the top edge of the top collar 21 is substantially aligned with the top end 104 of the threaded member. Thereafter, a liquid weld 120 or other suitable liquid adhesive may be applied to the top collar 21 and the weld pool so as to temporarily secure the top collar at the top position.

Figure 11:
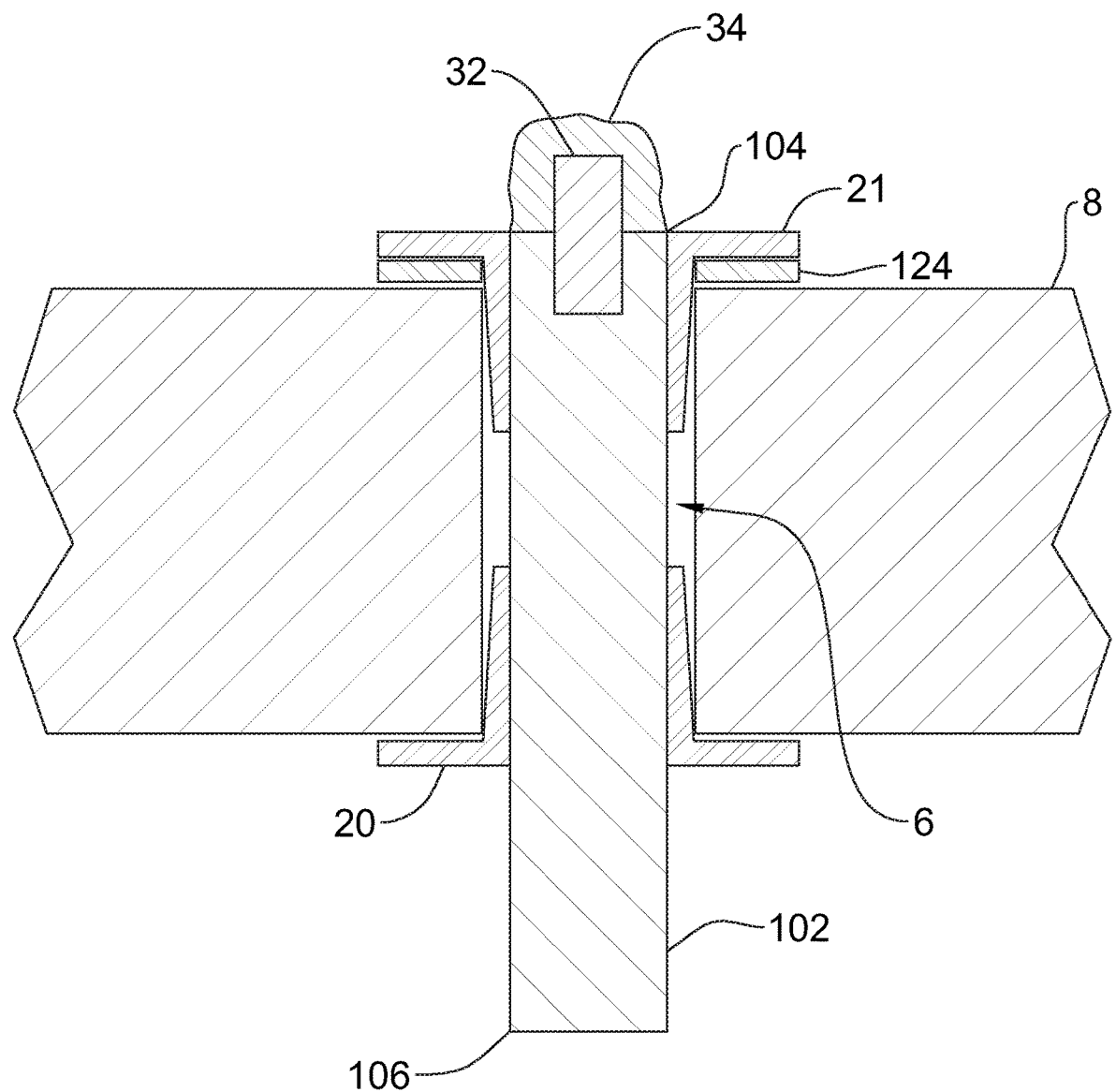
FIG. 11 is a cross sectional view of the stud of FIG. 8 positioned through a track of a vehicle.

In operation, the stud may be secured within the track as illustrated in FIG. 11 with reference to the embodiments of FIGS. 8-10. In particular a hole 6 may be bored through the track 8 by any known means and the threaded member 102 passed therethrough with the top and bottom collars 21 and 20 secured to opposite ends to clamp the track 8 therebetween. Optionally, a bushing 124, such as a disk of Teflon or other suitable material may be placed between the top collar 21 and the track 8 to reduce wear. During operation of the vehicle, it will be appreciated that the weld pool 34 will wear at a faster rate than the body of tungsten carbide 32 due to the weld pool being formed of a softer material. In such events, the tungsten carbide 32 will then be exposed providing a more wear resistant finish which is held in place by the remaining weld pool therearound.

Figure 12:
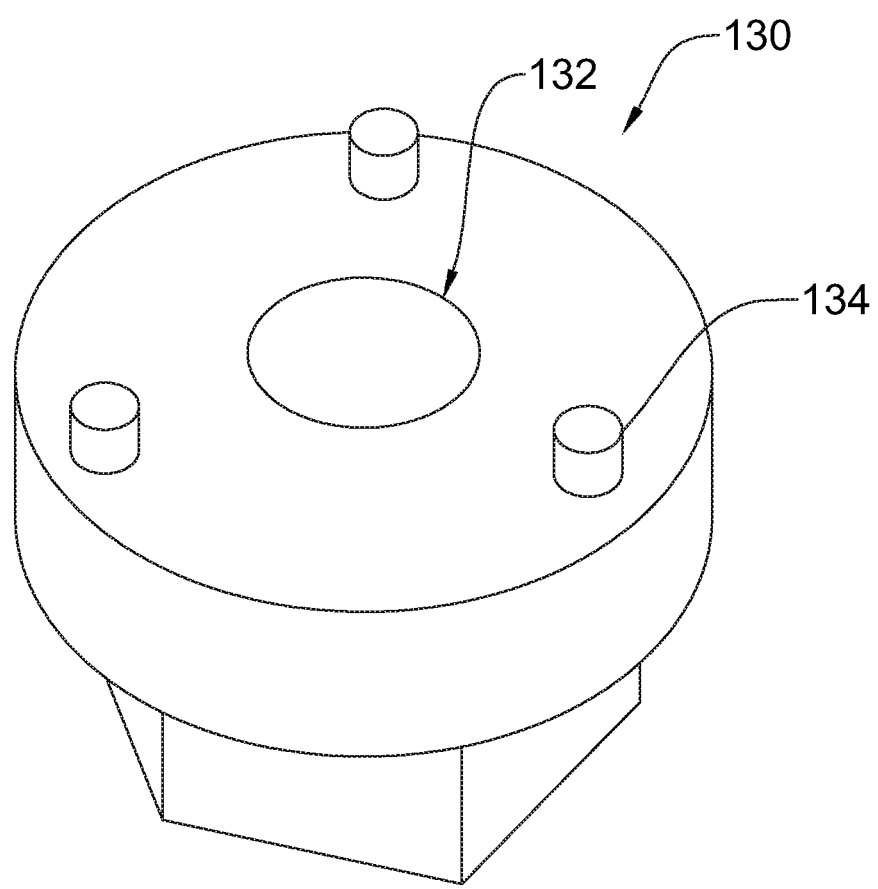
FIG. 12 is a perspective view of a stud for adjusting the stud of FIG. 8.

With reference to FIG. 10, during a short period of operation, the liquid weld 120 will be abraded away permitting the top collar 21 to be rotated relative to the threaded member. In such case, the height of the wear resistant body 30 may then be raised by loosening the bottom collar 20, and repositioning the top collar 21 at the desired height after which the bottom collar 20 may then be retightened. A socket 130 for use in loosening and tightening the top and bottom collars 20 and 21 is illustrated in FIG. 12 both on to the track and also for use in assembling and torqueing the top and bottom collars to the threaded member 12. The socket 130 includes a central bore 132 sized to pass the wear resistant body 30 and the cylindrical portion 24 of the top or bottom collar 21 or 20 therethrough and a plurality of pins 134 corresponding to the locations of the key bores 26.

Figure 13:
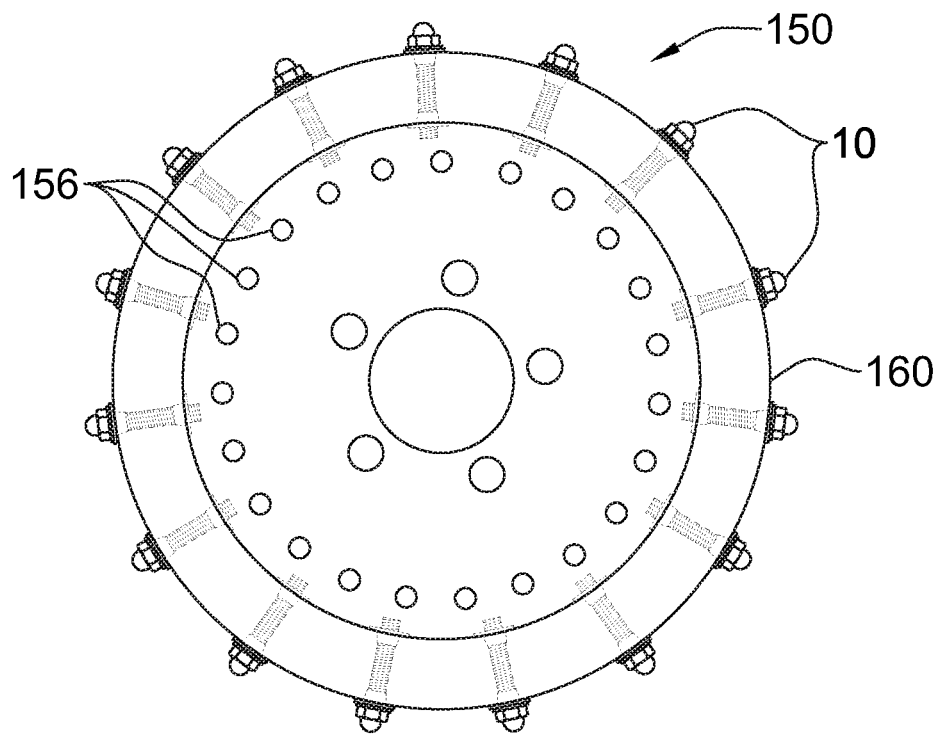
FIG. 13 is a side view of a wheel having a plurality of studs passed therethrough.
Figure 14:
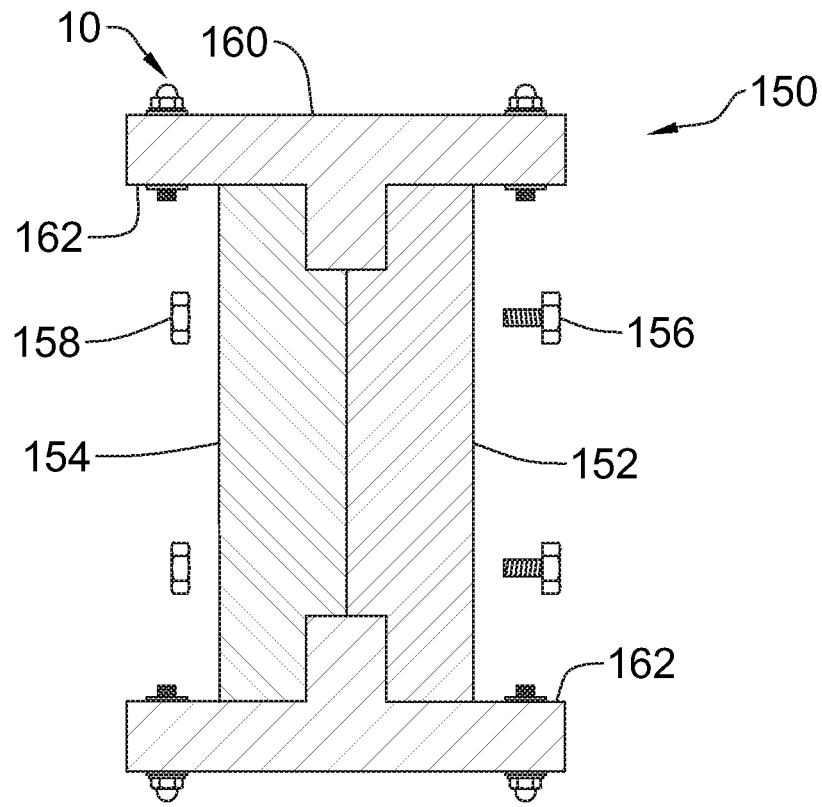
FIG. 14 is a cross sectional view of the wheel of FIG. 13.

Turning now to FIGS. 13 and 14, a rubber wheel 150 may also be adapted to receive the wear resistant studs disclosed above therein. In particular, the rubber wheel may be formed of first and second hubs, 152 and 154, respectively secured together with nuts and bolts, 156 and 158, as are commonly known. A solid rubber cylinder 160 may be disposed therearound having an overhang portion 162 adapted to extend beyond the first and second hubs 152 and 154. The overhand portion 162 is selected to provide a sufficient distance for the studs to pass through such as, by way of non-limiting example, between 1 and 6 inches (25 and 152 mm). It will also be appreciated that the rubber cylinder will have a thickness selected to provide sufficient strength to maintain the studs in contact with a ground surface. In practice, it has been found that a thickness of between 2 and 4 inches (51 and 102 mm) has been useful although it will be appreciated that other thicknesses may be useful as well. As illustrated, the wear resistant studs 10 may be passed through the overhang portion 162.

While specific embodiments of the invention have been described and illustrated, such embodiments should be considered illustrative of the invention only and not as limiting the invention as construed in accordance with the accompanying claims.

What is claimed is:

1. A method for securing a wear resistant body to a steel base comprising:
    locating a body of tungsten carbide on a surface of said steel base;
    surrounding said body of tungsten carbide with a weld pool; and
    while said weld pool is hot, applying heat through frictional contact with a rotating wire brush to the weld pool to reduce the cooling rate of said weld pool so as to assist with adhesion of the weld pool to the body of tungsten carbide.

2. The method of claim 1 wherein said weld pool completely covers said body of tungsten carbide and said top surface.

3. The method of claim 1 further comprising forming a cavity in said surface of said steel base wherein said body of tungsten carbide is located within said cavity prior to being surrounded by said weld pool.

4. The method of claim 1 wherein said top member comprises a bar extending perpendicularly between said at least to elongate threaded stud members.

5. The method of claim 4 wherein said body of tungsten comprises a length of tungsten carbide having a length less than said surface of said steel base.

6. The method of claim 1 wherein wire brush is applied to said weld pool until the weld pool reaches a temperature of 1000 degrees Fahrenheit.

7. The method of claim 1 wherein said weld pool is formed with MIG welding.

* * * * *